(12) United States Patent
Dean et al.

(10) Patent No.: US 7,579,073 B2
(45) Date of Patent: *Aug. 25, 2009

(54) COATING COMPOSITIONS SUITABLE FOR USE AS A WOOD STAIN AND/OR TONER

(75) Inventors: Roy E. Dean, Lower Burrell, PA (US); Robert T. Pogue, Pittsburgh, PA (US); Brian K. Rearick, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 495 days.

This patent is subject to a terminal disclaimer.

(21) Appl. No.: 11/545,682

(22) Filed: Oct. 10, 2006

(65) Prior Publication Data

US 2007/0031648 A1 Feb. 8, 2007

Related U.S. Application Data

(63) Continuation of application No. 11/096,847, filed on Apr. 1, 2005, now Pat. No. 7,351,475.

(51) Int. Cl.
*B32B 5/66* (2006.01)
(52) U.S. Cl. .............. 428/323; 428/325; 428/327; 428/328; 428/532; 428/535; 428/536; 428/537.1; 428/204; 428/207
(58) Field of Classification Search .......... 428/323, 428/325, 327, 328, 532, 535, 536, 537.1, 428/204, 207
See application file for complete search history.

(56) References Cited

U.S. PATENT DOCUMENTS

| 4,394,475 | A |  | 7/1983 | Temple et al. ........... 524/262 |
| 5,084,354 | A |  | 1/1992 | Krankkala et al. ........ 428/414 |
| 5,286,778 | A | * | 2/1994 | Dean et al. ............. 524/460 |
| 6,777,027 | B2 |  | 8/2004 | Daly et al. .............. 427/180 |
| 6,794,055 | B2 | * | 9/2004 | Dean et al. ............ 428/537.1 |
| 6,833,186 | B2 |  | 12/2004 | Perrine et al. ............ 428/329 |
| 7,001,667 | B2 | * | 2/2006 | Dean et al. .............. 428/481 |
| 7,351,475 | B2 | * | 4/2008 | Dean et al. .............. 428/407 |
| 2004/0013895 | A1 |  | 1/2004 | Dean et al. .............. 428/515 |

FOREIGN PATENT DOCUMENTS

| JP | 06336575 |  | 12/1994 |
| WO | WO 99/47617 |  | 9/1999 |
| WO | WO99/47617 | * | 9/1999 |

* cited by examiner

Primary Examiner—Kiliman Leszek
(74) Attorney, Agent, or Firm—Donald R. Palladino

(57) ABSTRACT

Coating compositions are disclosed that include a film-forming resin, a radiation cure initiator, a colorant, and a diluent. These compositions are substantially free of radiation curable material. Also disclosed are substrates at least partially coated with such compositions, substrates at least partially coated with a multi-layer composite coating comprising at least one coating layer deposited from such compositions, and methods for improving the adhesion of a multi-layer composite coating system to a porous substrate.

15 Claims, No Drawings

COATING COMPOSITIONS SUITABLE FOR USE AS A WOOD STAIN AND/OR TONER

CROSS-REFERENCE TO RELATED APPLICATION

This application is a continuation of U.S. patent application Ser. No. 11/096,847, filed on Apr. 1, 2005, now U.S. Pat. No. 7,351,475.

FIELD OF THE INVENTION

The present invention relates to coating compositions, substrates at least partially coated with a multi-layer composite coating system comprising a coating layer deposited from such coating compositions, and methods for improving the adhesion of multi-layer composite coating systems to substrates.

BACKGROUND OF THE INVENTION

There are a number of considerations relevant in the art of protective and decorative coating systems for substrates, such as wood substrates, including cabinets, floors, furniture, and the like. As will be appreciated, such coating systems are often made up of more than one coating layer. Porous substrates, such as wood, for example, are often coated with multi-layer composite coating systems that include a toner layer, a stain layer, a sealer layer, and a topcoat layer. Typically, the toner and/or stain layer(s) are coloring layers, i.e., they provide coloring. The sealer layer is often a protective layer that is sanded to provide a smooth finish, while the topcoat layer is often a protective layer that provides surface properties, such as mar and scratch resistance.

In many cases, the various coating layers in such multi-layer composite coating systems, including the coloring layers, such as stains, are deposited from coating compositions that contain radiation curable materials, such as resins that are curable by exposure to ultraviolet ("UV") radiation. Such resins can provide coatings exhibiting excellent properties, such as adhesion properties, and are often desirable for wood finish applications because of the heat sensitivity of wood, which often makes certain thermosetting coatings unfavorable.

There are some drawbacks, however, to using radiation curable materials in such coating compositions. Capital investment may be required to provide equipment, such as UV lamps, that are necessary to cure coating compositions that contain radiation curable resins. Moreover, in some cases, such as when it is desired to utilize wiping stains, toxicity issues may prevent the use of certain radiation curable materials.

As a result, it is desired to provide coating compositions, such as stain and toner compositions, that are free of radiation curable materials, but which can be used to provide multi-layer composite coating systems exhibiting acceptable properties, including acceptable adhesion properties.

SUMMARY OF THE INVENTION

In certain respects, the present invention is directed to coating compositions, such as stain and/or toner compositions, which comprise a film-forming resin, a radiation cure initiator, a colorant, and a diluent. These compositions are substantially free of radiation curable material.

In other respects, the present invention is directed to methods for improving the adhesion of a multi-layer composite coating system to a porous substrate. These methods of the present invention comprise the step of including a radiation cure initiator to a coating composition from which a colorant layer of the multi-layer composite coating system is deposited, wherein the composition is substantially free of radiation curable material, and wherein the multi-layer coating system comprises at least one coating layer deposited from a radiation curable composition.

In yet other respects, the present invention is directed to substrates at least partially coated with a multi-layer composite coating system. These coating systems comprise a colorant layer deposited from a coating composition comprising a film-forming resin, a radiation cure initiator, a colorant, and a solvent, wherein the coating composition is substantially free of radiation curable material, and at least one of a sealer and topcoat deposited from a radiation curable composition, applied over at least a portion of the colorant layer.

The present invention is also directed to coating compositions, such as stain and/or toner compositions, which comprise a film-forming resin, a free radical photoinitiator, a colorant, and a diluent. These compositions are substantially free of material susceptible to free radical cure.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. For example, and without limitation, this application refers to coating systems that comprise a colorant layer. Such references to "a colorant layer" is meant to encompass coating systems comprising one colorant layer as well as coating systems that comprise more than one colorant layer, such as coating systems that comprise two colorant layers. In addition, in this application, the use of "or" means "and/or" unless specifically stated otherwise, even though "and/or" may be explicitly used in certain instances.

In certain embodiments, the present invention is directed to coating compositions, such as stain or toner compositions, suitable for application over porous substrates, such as wood. As used herein, the term "porous substrate" refers to substrates that contain pores or interstices that allow a liquid composition to penetrate the surface of the substrate. As used herein, the term "stain" refers to a translucent composition that can color a porous substrate, such as wood, while allowing some of the substrate's natural color and grain to show through. As used herein, the term "toner" refers to a composition that performs a function similar to a stain in that it can color a porous substrate, however, a "toner" is typically a low solids composition (no more than 5 weight percent solids and at least 95 weight percent solvent) and is typically applied to a substrate at a low film thickness before a stain is applied.

The coating compositions of the present invention comprise a film-forming resin. As used herein, the term "film-forming resin" refers to resins that can form a self-supporting continuous film on at least a horizontal surface of a substrate upon removal of any diluents or carriers present in the composition or curing.

The film-forming resin utilized in the compositions of the present invention is not limited and may include, for example, any film-forming resin typically used in the art, such as polyurethanes, acrylics, vinyls, melamines, polyvinylchlorides, polyolefins, polyureas, polycarbonates, polyethers, polyesters, epoxies, silicones, polyamides, and the like, so long as the composition is substantially free of radiation curable material. In certain embodiments, for example, the film-forming resin comprises an alkyd resin. As used herein, the term "alkyd resin" denotes a synthetic resin that is the reaction product of a polybasic acid or anhydride, a polyhydric alcohol, and an oil fatty acid. Such resins are often prepared by polycondensation of various polybasic acids, polyhydric alcohols and fatty acids. As used herein, the term "oil fatty acid" includes, for example, drying oils, semi-drying oils, and non-drying oils, including mixtures thereof. As will be appreciated by those skilled in the art, when one or more drying oils, one or more semi-drying oils or mixtures of drying and semi-drying oils are used, the coating compositions of the present invention will be capable of undergoing oxidative cure. Similarly, if a mixture of at least one of the drying oils or the semi-drying oils with a non-drying oil is used, with the mixture being predominantly drying and/or semi-drying, the compositions will also undergo oxidative cure. "Predominantly drying" and/or "semi-drying" means that at least about 45 percent of the oils used are drying and/or semi-drying. Both drying and semi-drying oils contain carbon-carbon double bonds that are capable of undergoing oxidative crosslinking, whereas nondrying oils either don't contain such bonds or don't contain a sufficient number of such bonds to effect cure.

Examples of suitable drying and semi-drying oils include castor oil, dehydrated castor oil, cottonseed oil, fish oil, linseed oil, menhaden oil, oiticica oil, palm kernel oil, perilla oil, safflower oil, sardine oil, soybean oil, sunflower oil, tall oil, tung oil, and walnut oil. Examples of suitable non-drying oils include valeric acid, heptanoic acid, 2-ethyl hexanoic acid, pelargonic acid, isononanoic acid, lauric acid, coconut oil fatty acid, stearic acid and branched fatty acids containing 18 carbon atoms. Predominantly drying/semi-drying oils are often more appropriate for use in the present stains.

Suitable polyhydric alcohols that can be used in forming such alkyd resins include glycerol, neopentyl glycol, cyclohexanedimethanol, ethylene glycol, propylene glycol, pentaerythritol, neononyl glycol, diethylene glycol, dipropylene glycol, trimethylene glycol, trimethylolpropane, dipentaerythritol, tripentaerythritol, and the like.

Suitable polybasic acids/anhydrides that can be used in forming such alkyd resins include polycarboxylic acids and anhydrides thereof. Examples of suitable polycarboxylic acids include phthalic acid, isophthalic acid, terephthalic acid, tetrahydrophthalic acid, hexahydrophthalic acid, adipic acid, azelaic acid, glutaric acid, 3,3-diethylglutaric acid, malonic acid, pimelic acid, sebacic acid, suberic acid, succinic acid, 2,2-dimethylsuccinic acid, 2-methylsuccinic acid, dodecenylsuccinic acid, itaconic acid, fumaric acid, maleic acid, citraconic acid, diethyl maleic acid, and trimellitic acid; the anhydrides of those polybasic acids are also suitable. Polybasic acids having greater than three acid moieties or the higher polyfunctional alcohols should not be utilized in amounts that will cause the alkyd resin to gel during preparation.

In certain embodiments, for example in certain instances where the composition comprises a toner composition, the film-forming resin comprises a cellulosic resin. As used herein, the term "cellulosic resin" refers to the generally known thermoplastic polymers which are derivatives of cellulose, examples of which include: nitrocellulose; organic esters and mixed esters of cellulose such as cellulose acetate, cellulose propionate, cellulose butyrate, and cellulose acetate butyrate; and organic ethers of cellulose such as ethyl cellulose.

In certain embodiments, such as certain instances where the coating composition comprises a stain, the coating compositions of the present invention comprise 0.25 up to 15 percent by weight of film-forming resin or, in some embodiments, 9 up to 15 percent by weight, or, in yet other embodiments, 10 up to 12 percent by weight of film-forming resin based on the total weight of the composition. In other embodiments, such as certain instances where the coating composition comprises a toner, the coating composition of the present invention comprises 0.25 up to 5 percent by weight of film-forming resin or, in some embodiments, 0.5 up to 2 percent by weight, or, in yet other embodiments, 0.5 up to 1.5 percent by weight of film-forming resin based on the total weight of the composition.

The coating compositions of the present invention also comprise a radiation cure initiator. As used herein, the term "radiation cure" refers to polymerization that occurs upon exposure of a material to an energy source, such as an electron beam (EB), UV light, or visible light. Yet, as previously indicated, the compositions of the present invention are substantially free or, in some cases, completely free, of radiation curable material. As used herein, the term "radiation curable material" refers to materials having reactive components that are polymerizable by exposure to at least one of the energy sources mentioned earlier. As used herein, the term "radiation curable composition" refers to a composition that comprises a radiation curable material. As used herein, the term "substantially free" means that the material is present in the composition, if at all, as an incidental impurity. In other words, the material does not effect the properties of the composition. As used herein, the term "completely free" means that the material is not present in the composition at all.

Examples of radiation curable materials are materials susceptible to radiation cure by cationic and/or free radical cure mechanisms. As those skilled in the art will appreciate, in a cationic cure mechanism, the reactive functionality of the resin reacts by means of positively charged chemical species, while, in a free-radical cure mechanism, the reactive functionality of the resin reacts by means of free radical (uncharged) intermediate species.

In certain embodiments, the radiation cure initiator comprises a photoinitiator selected from a cationic photoinitiator and/or a free radical photoinitiator. As used herein, the term "cationic photoinitiator" refers to photoinitiators that initiate cationic cure, while the term "free radical photoinitiator" refers to materials that initiate free radical cure. For example, in cases where the coating compositions of the present invention are to be used in a coating system in conjunction with a coating layer deposited from a radiation curable composition that comprises a radiation curable material susceptible to cationic cure, as described in more detail below, it is often desirable to include a cationic photoinitiator in the coating composition of the present invention. Conversely, in cases where the coating compositions of the present invention are to be used in a coating system in conjunction with a coating layer deposited from a radiation curable composition that comprises a radiation curable material susceptible to free radical cure, as described in more detail below, it is often desirable to include a free radical photoinitiator in the coating composition of the present invention.

Examples of cationic photoinitiators suitable for use in the present invention include, for example, onium salts, aromatic diazonium salts of complex halides, certain metallocenes, and combinations thereof.

Suitable onium salts include, for example, those having the formulas, $R_2I^+MX_z^-$, $R_3S^+MX_z^-$, $R_3Se^+MX_z^-$, $R_4P^+MX_z^-$, and $R_4N^+MX_z^-$, wherein each R is an organic group having from 1 to 30 carbon atoms, for example, aromatic carbocyclic groups having from 6 to 20 carbon atoms. Each R group can be substituted with from 1 to 4 monovalent hydrocarbon groups, for example alkoxy groups having from 1 to 8 carbon atoms, alkyl groups having from 1 to 16 carbon atoms, nitro, chloro, bromo, cyano, carboxyl, mercapto, or aromatic heterocyclic groups exemplified by pyridyl, thiophenyl, and pyranyl. $MX_z^-$ is a non-basic, non-nucleophilic anion, for example, an inorganic anion such as $BF_4^-$, $B(C_6F_5)_4^-$, $PF_6^-$, $AsF_6^-$, $SbF_6^-$, $SbCl_6^-$, $HSO_4^-$, $ClO_4^-$, $FeCl_4^-$, $SnCl_6^-$, or $BiCl_5^-$; the anion of an organic sulfonic acid, such as benzene sulfonic acid, dodecylbenzene sulfonic acid, or 3-nitrobenzene sulfonic acid; or the anion of a perfluoroalkylsulfonic acid, for example perfluorobutanesulfonic acid, perfluoroethanesulfonic acid, perfluorooctanesulfonic acid, or a combination thereof.

More specific examples of suitable onium salts are diaryliodonium salts of sulfonic acid; diaryliodonium salts of boronic acids, for example, tolyl cumyliodonium tetrakis (pentafluorophenyl) borate; bis(dodecyl phenyl) iodonium hexafluoroarsenate; bis(dodecylphenyl) iodonium hexafluoroantimonate; dialkylphenyl iodonium hexafluoroantimonate; triarylsulfonium salts of sulfonic acid; triarylsulfonium salts of perfluoroalkylsulfonic acids; and triarylsulfonium salts of aryl sulfonic acids; triarylsulfonium salts of perfluoroalkylsulfonic acids, or a combination thereof.

Suitable aromatic diazonium salts of complex halides, include, for example, 2,4-dichlorobenzenediazonium tetrachloroferrate(III), p-nitrobenzenediazonium tetrachloroferrate(III), p-morpholinobenzenediazonium tetrachloroferrate (III), 2,4-dichlorobenzenediazonium hexachlorostannate (IV), p-nitrobenzenediazonium hexachlorostannate(IV), 2,4-dichlorobenzenediazonium tetrafluoroborate, or a combination thereof.

Also suitable are certain metallocenes, for example the ferrociniums having the formula $[R^a(Fe^{11}R^b)_c]_d^{+c}[x]_c^{-d}$, wherein, c is 1 or 2; d is 1, 2, 3, 4 or 5; X is a non-nucleophilic anion, for example $BF_4^-$, $PF_6^-$, $AsF_6^-$, $SbF_6^-$, $SbF_5(OH)^-$, $CF_3SO_3^-$, $C_2F_5SO_3^-$, $n\text{-}C_3F_7SO_3^-$, $n\text{-}C_4F_9SO_3^-$, $n\text{-}C_6F_{13}SO_3^-$, $n\text{-}C_8F_{17}SO_3^-$, $C_6F_5SO_3^-$, phosphorus tungstate, or silicon tungstate; $R^a$ is a pi-arene, and $R^b$ is an anion of a pi-arene, such as a cyclopentadienyl anion. Examples of suitable pi-arenes are toluene, xylene, ethylbenzene, cumene, methoxybenzene, methyinaphthalene, pyrene, perylene, stilbene, diphenylene oxide and diphenylene sulfide. An example of a visible light cationic photoinitiator is ($\eta_5$-2,4-cyclopentadien-1-yl) ($\eta_6$-isopropylbenzene)-iron(II) hexafluorophosphate, available under the trade name IRGACURE 261 from Ciba. Other commercially available cationic photoinitiators suitable for use in the present invention include CYRACURE UVI-6992 and CYRACURE UVI-6976 from Dow Chemical Company.

To increase the light efficiency, or to sensitize the cationic photoinitiator to specific wavelengths, it is also possible, depending on the type of initiator, to use sensitizers. Examples are polycyclic aromatic hydrocarbons or aromatic keto compounds, for example benzoperylene, 1,8-diphenyl-1,3,5,7-octatetraene, or 1,6-diphenyl-1,3,5-hexatriene.

Examples of free radical photoinitiators suitable for use in the present invention include, for example, alpha-cleavage photoinitiators and hydrogen abstraction photoinitiators. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of free radical photoinitiators that may be used in the coating compositions of the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthioxantone, α-aminoalkylphenone, e.g., 2-benzyl-2-dimethylamino-1-(4-morpholinophenyl)-1-butanone, acylphosphine oxides, e.g., 2,6-dimethylbenzoyldiphenyl phosphine oxide, 2,4,6-trimethylbenzoyidiphenylphosphine oxide, bis (2,4,6-trimethylbenzoyl) phenyl phosphine oxide, 2,6-dichlorobenzoyl-diphenylphosphine oxide, and 2,6-dimethoxybenzoyl-diphenylphosphine oxide, bisacylphosphine oxides, e.g., bis (2,6-dimethyoxybenzoyl)-2,4,4-trimethylepentylphosphine oxide, bis(2,6-dimethylbenzoyl)-2,4,4-trimethylpentylphosphine oxide, bis (2,4,6-trimethylbenzoyl)-2,4,4-trimethylpentylphosphine oxide, and bis(2,6-dichlorobenzoyl)-2,4,4-trimethylpentylphosphine oxide, and mixtures thereof.

In certain embodiments, the coating compositions of the present invention comprise 0.01 up to 15 percent by weight of photoinitiator or, in some embodiments, 0.01 up to 10 percent by weight, or, in yet other embodiments, 0.01 up to 5 percent by weight of photoinitiator based on the total weight of the composition.

As should be apparent from the foregoing description, the present invention is also directed to coating compositions comprising a free radical photoinitiator, wherein the composition is substantially free, or, in some cases, completely free, of material susceptible to free radical cure.

As previously indicated, the coating compositions of the present invention also comprise a colorant. The colorant may comprise one or more pigments, dyes, and/or tints. In certain embodiments, any combination of pigments, dyes and/or tints suitable for use in a wood toner and/or wood stain is used. Such products are widely commercially available, such as from DuPont, BASF, and Elementis Specialties, among others.

In certain embodiments, the coating compositions of the present invention comprise 0.1 up to 30 percent by weight of the colorant or, in some embodiments, 1 up to 6 percent by weight of the colorant, based on the total weight of the composition.

In addition, the coating compositions of the present invention comprise a diluent. Suitable diluents include organic solvents, water, and/or water/organic solvent mixtures. Suitable organic solvents include, for example, alcohols, ketones, aromatic hydrocarbons, glycol ethers, esters or mixtures thereof. In certain embodiments, the diluent is present in the coating compositions of the present invention in an amount ranging from 5 to 80 weight percent based on total weight of the composition, such as 30 to 50 percent.

In certain embodiments, the compositions of the present invention comprise an additive comprising an organo-silicon or organo-fluorine containing molecule or polymer, such as an organo silane, which the inventors have found can aid in imparting nickel scrape resistance to coatings formed from the composition. Non-limiting examples of suitable organo silanes include vinyl and allyl halo, alkoxy, amino organo, acryloxy or methacrylate silanes, their hydrolysis products and polymers of the hydrolysis products and mixtures of any of these materials. Some of these silanes are disclosed in U.S. Pat. Nos. 2,688,006; 2,688,007; 2,723,211; 2,742,378; 2,754,237; 2,776,910; and 2,799,598. In certain embodiments, the coating compositions of the present invention comprise an amino silane, an epoxy silane, or, in some cases, a mixture thereof.

Non-limiting examples of amino silanes that are suitable for use in the compositions of the present invention include monoamino and diamino silanes, including γ-aminopropyl-triethoxysilane, N-(trimethoxysilypropyl)ethane diamine acrylamide and other similar mono and diamino silanes. Lubricant modified amino silanes may also be used. In certain embodiments, such monoamino silanes have an amino functionality designated by the general formula:

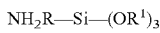

wherein R is an alkylene radical having from 2 to 8 carbon atoms and $R^1$ is a lower alkyl radical or hydrogen (the lower alkyl radical having from 1 to 5 carbon atoms, such as 1 to 2 carbon atoms). Additional examples of suitable amino silanes include aminomethyltriethoxysilane, aminopropyltrimethoxysilane, γ-aminopropyltrimethoxysilane, aminoethylaminopropyltrimethoxysilane, diaminopropyldiethoxysilane, triaminopropylethoxysilane, and the like.

Also suitable for use in the compositions of the present invention are epoxy silanes, such as those designated by the formula:

wherein $R^1$ is as described above and y is an integer having a value ranging from 1 to 6. Representative examples of such epoxy silanes include β-hydroxyethyltriethoxysilane, γ-hydroxypropyltrichlorosilane, bis-(Δ-hydroxybutyl)dimethoxysilane, Δ-hydroxybutyltrimethoxysilane, 2,3-epoxypropyltrimethoxysilane, 3,4-epoxybutyltriethoxysilane, and bis-(2,3-epoxypropyl)dimethoxysilane, glycidoxypropyltrimethoxysilane, 3,4-epoxycyclohexyltriethoxysilane.

Suitable organo-silicon containing polymers include homopolymers, copolymers or block polymers and can be of virtually any length and complexity so long as the molecule does not interfere with desired properties of the coating composition. The polymers can be, without limitation, acrylics, polyesters, polyethers, polysiloxanes, urethanes or combinations thereof. In certain embodiments, the polymer comprises the reaction product of one or more monomers in which at least one monomer has a pendant silyl group. The polymer can be a homopolymer of silyl group-containing acrylic monomers or a co-polymer of two or more acrylic monomers, one of which includes a pendant silyl group. A suitable acrylic monomer which includes a pendant silyl group is γ-methacryloxypropyltrimethoxysilane (SILQUEST® A-174 silane commercially available from OSI Specialties Inc.). Such a monomer can be reacted with a suitable vinyl monomer, such as an acrylic monomer, such as methyl (meth)acrylate, ethyl (meth)acrylate, butyl (meth)acrylate, ethylhexyl (meth)acrylate, stearyl (meth)acrylate, benzyl (meth)acrylate, cyclohexyl (meth)acrylate, lauryl (meth)acrylate, isobornyl (meth)acrylate, hydroxypropyl (meth)acrylate, hydroxyethyl (meth)acrylate, hydroxybutyl (meth)acrylate, trifluoroethyl (meth)acrylate, pentafluoropropyl (meth)acrylate, perfluorocyclohexyl (meth)acrylate, (meth)acrylonitrile, glycidyl (meth)acrylate, dimethylaminoethyl (meth)acrylate, diethylaminoethyl (meth)acrylate, (meth)acrylamide, alpha-ethyl (meth)acrylamide, N-butoxymethyl (meth)acrylamide, N,N-dimethyl acrylamide, N-methyl acrylamide, acryloyl morpholine and N-methylol (meth)acrylamide or a combination thereof.

Any number of other silanes containing at least one organic group substituted by one or more of an amino group or an epoxy group may also be used in certain embodiments of the compositions of the present invention, and these silanes are well known to those skilled in the art. In certain embodiments, the coating compositions of the present invention comprise up to 2 percent by weight of organosilane or, in some embodiments, 0.1 up to 2 percent by weight of organosilane, based on the total weight of the composition.

In addition, the coating compositions of the present invention can contain other optional ingredients including ultraviolet absorbers, pigments, and inhibitors known in the art. Also, various fillers, plasticizers, flow control agents, surfactants and other known formulating additives may be used. Also useful in the coating compositions of the invention is an aluminum or titanium chelating crosslinker, such as ALUSEC 510 ethyl acetoacetato-di-2-ethoxy aluminum manufactured by Manchem Ltd. or TYZOR TPT tetraisopropyl titanate manufactured by DuPont. In certain embodiments, an antiskin agent, such as methyl ethyl ketoxime may be added to, for example, improve package stability. In some cases, fillers and flatting agents, such as clay, talc, silica, and the like can be added. Suitable silicas are commercially available from W.R. Grace and Company as SYLOID 169 and from DeGussa Corporation as AEROSIL 972. Sag resistance additives, such as cellulose acetate butyrate 551-0.2 from Eastman Chemicals can also be included, as can other additives that enhance properties. Various additives, when used, typically comprise no more than 30 weight percent, such as no more than 10 weight percent, of the coating composition based on the total weight of the composition.

The coating compositions of the present invention can be applied to any of a variety of substrates. In certain embodiments, however, the coating compositions of the present invention are applied to a porous substrate, such as paper, cardboard, particle board, fiber board, wood, wood veneers, and wood products. Various woods that can be stained with the present compositions include, for example, oak, pine, and maple. These types of woods are used in the preparation of, for example, kitchen cabinets, bath cabinets, tables, desks, dressers, and other furniture, as well as flooring, such as hardwood and parquet flooring.

The coating compositions of the present invention can be applied to the substrate by any means known in the art. For example, they can be applied by brushing, dipping, flow coating, roll coating and conventional and electrostatic spraying.

Once applied, certain embodiments of the coating compositions of the present invention are allowed to soak into the porous substrate for a predetermined amount of time, and the excess stain wiped off. Multiple layers can be applied. When the coating composition of the present invention comprises a wood stain comprising an alkyd resin, as described above, the stain can then be cured by oxidative cure accomplished by allowing the coated substrate to be exposed to ambient or elevated temperature conditions. For example, the ambient or elevated temperature conditions can be those generally considered to be "air dry" or "force dry" conditions. This occurs at temperatures ranging from about 13° C. to 250° C., such as 20° C. to 150° C., or 50° C. to 90° C. Oxidative cure in the absence of accelerating conditions can take place over the course of several days to several weeks.

As will be appreciated, particularly in the treatment of wood substrates, additional layers such as a sealer and/or a topcoat may be applied over the top of a stain and/or toner layer. Therefore, certain embodiments of the present invention are directed to substrates at least partially coated with a multi-layer composite coating system. As used herein, the term "multi-layer composite coating system" refers to coating system that contains at least two coating layers applied successively over a substrate, such as a porous substrate.

These coating systems of the present invention comprise (i) a colorant layer deposited from any of the foregoing coating compositions of the present invention and (ii) at least one of a sealer and topcoat deposited from a radiation curable composition, applied over at least a portion of the colorant layer. In certain embodiments, the coating systems of the present invention comprise (i) a toner layer deposited from any of the foregoing coating compositions of the present invention, (ii) a stain layer deposited from any of the foregoing coating compositions of the present invention, wherein the stain layer is deposited over at least a portion of the toner layer, (iii) a sealer deposited from a radiation curable composition, wherein the sealer is deposited over at least a portion of the stain layer and/or toner layer, and (iv) a topcoat deposited from a radiation curable composition, wherein the topcoat is deposited over at least a portion of the sealer. In certain embodiments, the radiation curable composition from which at least one of the sealer and topcoat is deposited comprises a 100% solids or waterborne composition.

As used herein, the term "sealer" refers to a protective coating applied directly to a colorant layer, such as a toner and/or stain, while a "topcoat" refers to a protective coating applied directly to the sealer. In the coating systems of the present invention, the sealer and/or topcoat are deposited from radiation curable compositions, such as compositions comprising a radiation curable material susceptible to cationic and/or free radical cure. For example, in certain embodiments the sealer and/or the topcoat are deposited from a composition comprising a polymer comprising an alkyd portion and a free radical curable portion, such as is described in United States Patent Application Publication No. 2004-0013895 A1 at [0005] to [0022], which is incorporated by reference herein.

In certain embodiments, the sealer and/or topcoat are deposited from a radiation curable composition that comprises a radiation curable material susceptible to cationic cure. In such cases, it is often desirable to include a cationic photoinitiator in the coating composition from which the colorant layer is deposited. In other embodiments of the present invention, the sealer and/or topcoat are deposited from a radiation curable composition that comprises a radiation curable material susceptible to free radical cure. In such cases, it is often desirable to include a free radical photoinitiator in the coating composition from which the colorant layer is deposited.

In certain embodiments of the present invention, the toner and/or stain is applied to the substrate. The stain and/or toner may or may not undergo oxidative cure before application of the sealer and/or topcoat (application of the sealer/topcoat to the uncured stain and/or toner will be understood by one skilled in the art as a "wet on wet" application). After the sealer and/or topcoat is applied, these layers are at least partially cured. While not being bound by any theory, it is believed that some radiation curable monomers present in the sealer/topcoat radiation curable compositions may migrate into the stain layer, the toner layer, and/or the porous substrate during application and prior to cure. The presence of radiation curable initiators in the stain layer, the toner layer, and/or the porous substrate, despite the substantial absence of radiation curable material in the composition from which the stain and/or toner layers were deposited, may allow the radiation curable monomers that have migrated therein to be cured during cure of the sealer and/or topcoat. As a result, interlayer bonding may occur, and interlayer adhesion as well as adhesion to the substrate improved. As indicated, however, the present invention is not limited to this mechanism. As a result, the multi-layer composite coatings of the present invention may offer desirable levels of adhesion, toughness, appearance, feel and/or stain/solvent resistance, among other properties. As used herein, the term "partial cure" refers to any stage of curing between complete cure and no cure.

In certain embodiments, the substrates of the present invention are coated with a multi-layer composite coating exhibiting a tape adhesion of at least 50%, with tape adhesion testing being performed according to ASTM D-359. In certain embodiments, such coatings exhibit a tape adhesion of at least 85% or, in some cases, 100%.

In certain embodiments, the substrates of the present invention are coated with a multi-layer composite coating exhibiting nickel scrape resistance of at least 8. Nickel scrape resistance is an evaluation of a coating system's resistance to gouge. As used herein, nickel scrape resistance is tested using five replicates on a single sample and with results reported in comparison to a control coating system. The test may be conducted using a United States Government 5 cent coin without obviously worn surfaces. The nickel is grasped between the thumb and forefinger and, using medium to firm pressure, the nickel edge is scraped over the coated surface. The pressure # required to gouge the coated surface is assigned a whole number from 1 to 10 with 1 being minimal effort and 10 being maximum effort.

As will be appreciated by the skilled artisan, the present invention is further directed to methods for improving the adhesion of a multi-layer composite coating system to a porous substrate, which can be measured by the tape adhesion test described earlier. These methods of the present invention comprise the step of including a radiation cure initiator to a coating composition from which at least one layer of the multi-layer coating system is deposited, wherein the composition is substantially free of radiation curable material, and wherein the multi-layer coating system comprises at least one coating layer deposited from a radiation curable composition.

The present invention also provides methods for at least partially coating a porous substrate with a multi-layer composite coating system. These methods comprise: (a) applying a colorant layer to a porous substrate; and (b) applying at least one of a sealer and topcoat, deposited from a radiation curable composition, over at least a portion of the colorant layer. In these methods of the present invention, the colorant layer is deposited from a coating composition of the present invention. The sealer and/or topcoat coating compositions can then be cured. Thus, for example, the sealer and/or topcoat compositions may be cured by irradiation with actinic radiation as is known to those skilled in the art. In certain embodiments, curing can be completed in less than one minute.

In certain embodiments, an ultraviolet light source having a wavelength range of 180 to 4000 nanometers may be used to cure the sealer and/or topcoat compositions. For example, sunlight, mercury lamps, arc lamps, xenon lamps, gallium lamps, and the like may be used. In one example, the sealer and/or topcoat compositions may be cured by a medium pressure mercury lamp having an intensity of 48 to 360 W/cm, for a total exposure of 100 to 2000 $mJ/cm^2$, such as 500 to 1000 $mJ/cm^2$ as measured by a POWERMAP UV Radiometer commercially available from EIT Inc., Sterling, Va.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Maple veneers were sanded with 220 grit sandpaper. A rouge toner (C1442A33 from PPG Industries, Inc.) was then applied using a single pass of a Binks Model 2001 hand-held spray gun using 30 to 40 psi air pressure to achieve a uniform layer. The coated veneers were given a one-minute ambient temperature flash and then a rouge stain (C1453A31 from PPG Industries, Inc.) was then applied using a single pass of a Binks Model 2001 hand-held spray gun using 30 to 40 psi air pressure to achieve a uniform layer and the excess was then rag wiped. After a fifteen-minute flash at ambient temperature, and a four minute bake at 180° F., a sealer composition (R1659Z49 from PPG Industries, Inc.) was then applied at a dry film thickness of about 0.4 mils using a Devilbiss JGHV-530 hand-held spray gun using 60 psi air pressure. The coated veneers were given 700 $mj/cm^2$ of UV-A exposure, and then allowed to cool at ambient temperature for an additional five minutes. The cured veneer was then sanded with 280 grit sandpaper. A topcoat was then applied using a UV curable topcoat composition (R1594Z83 from PPG Industries, Inc.) applied at a dry film thickness of about 0.6 mils using a Devilbiss JGHV-530 hand-held spray gun using 60 psi air pressure. The coated veneers were given 1050 $mj/cm^2$ of UV-A exposure.

Example 2

A rouge toner composition was prepared using the ingredients listed in Table 1. The ingredients were added to a paint can with agitation from a Cowles blade. After mixing of all ingredients, mixing was continued from approximately 5 to 10 minutes to ensure homogeneicty.

TABLE 1

| Ingredient | Parts By Weight (grams) |
| --- | --- |
| C1442A33[1] | 50 |
| IRGACURE 819[2] | 1 |

[1]A rouge toner obtained from PPG Industries, Inc.
[2]A bis acyl phosphine oxide photoinitiator available from Ciba Specialty Chemicals Corp.

Maple veneers were sanded with 220 grit sandpaper. A rouge toner prepared from the ingredients listed in Table 1 was then applied, followed by a rouge wiping stain, a sealer, and a topcoat. The rouge toner was applied in the same manner as the toner described in Example 1. The rouge wiping stain, sealer, and topcoat comprised the same compositions identified in Example 1 and were applied in the manner described in Example 1.

Example 3

A rouge toner composition was prepared using the ingredients listed in Table 2. The ingredients were added to a paint can with agitation from a Cowles blade. After mixing of all ingredients, mixing was continued from approximately 5 to 10 minutes to ensure homogeneicty.

TABLE 2

| Ingredient | Parts By Weight (grams) |
| --- | --- |
| C1442A33[1] | 50 |
| IRGACURE 819[2] | 1 |
| Z-6020 silane[3] | 1 |

[1]A rouge toner obtained from PPG Industries, Inc.
[2]A bis acyl phosphine oxide photoinitiator available from Ciba Specialty Chemicals Corp.
[3]N-(b-aminoethyl)-g-aminopropyltrimethoxysilane available from Dow Corning Corp.

Maple veneers were sanded with 220 grit sandpaper. A rouge toner prepared from the ingredients listed in Table 2 was then applied, followed by a rouge wiping stain, a sealer, and a topcoat. The rouge toner was applied in the same manner as the toner described in Example 1. The rouge wiping stain, sealer, and topcoat comprised the same compositions identified in Example 1 and were applied in the manner described in Example 1.

Example 4

A rouge toner composition was prepared using the ingredients listed in Table 3. The ingredients were added to a paint can with agitation from a Cowles blade. After mixing of all ingredients, mixing was continued from approximately 5 to 10 minutes to ensure homogeneicty.

TABLE 3

| Ingredient | Parts By Weight (grams) |
| --- | --- |
| C1442A33[1] | 50 |
| IRGACURE 819[2] | 1 |
| A-186 silane[3] | 1 |

[1]A rouge toner obtained from PPG Industries, Inc.
[2]A bis acyl phosphine oxide photoinitiator available from Ciba Specialty Chemicals Corp.
[3]A beta-(3,4-epoxycyclo hexyl)ethyltrimethoxy silane available from OSI Specialties Inc.

Maple veneers were sanded with 220 grit sandpaper. A rouge toner prepared from the ingredients listed in Table 3 was then applied, followed by a rouge wiping stain, a sealer, and a topcoat. The rouge toner was applied in the same manner as the toner described in Example 1. The rouge wiping stain, sealer, and topcoat comprised the same composition identified in Example 1 and were applied in the manner described in Example 1.

Test Substrates

After application and curing of the topcoat, the veneers were allowed to rest at room temperature overnight. All of the veneers were then tested as described in Table 4.

TABLE 4

| Example | Tape Adhesion[1] | Nickel Scrape[2] |
|---------|------------------|------------------|
| 1 | 0B | 1 |
| 2 | 3B | 3 |
| 3 | 5B | 6 |
| 4 | 3B | 5 |

[1]Nickel scrape adhesion is a quantitative evaluation of a coating system's resistance to gouge. Nickel scrape was tested using several replicates on a single sample and with results reported in comparison to a control coating system. The test was conducted using a United States Government 5 cent coin without obviously worn surfaces. The nickel was grasped between the thumb and forefinger and, using medium to firm pressure, the nickel edge was scraped over the coated surface. The pressure # required to gouge the coated surface was assigned a whole number from 1 to 10 with 1 being minimal effort and 10 being maximum effort.
[2]Performed using 3M Scotch Masking Tape 250 3005, with performance rated on the following scale: 5B = 100% adhesion; 4B = 99%-95% adhesion; 3B = 85%-94% adhesion; 2B = 65%-84% adhesion; 1B = 35%-64% adhesion; 0B = 0%-34% adhesion.

Whereas particular embodiments of this invention have been describe above for purposes of illustration, it will be evident to those skilled in the art that numerous variations of the details of the present invention may be made without departing from the invention as defined in the appended claims.

We claim:

1. A substrate at least partially coated with a coating composition comprising:
    (a) a film-forming resin,
    (b) a radiation cure initiator,
    (c) a colorant, and
    (d) a diluent,
    wherein the coating composition is substantially free of radiation curable material.

2. The substrate of claim 1, wherein the substrate comprises a porous substrate.

3. The porous substrate of claim 2, wherein the substrate comprises wood.

4. A substrate at least partially coated with a multi-layer composite coating system, wherein the multi-layer composite coating system comprises:
    (a) a colorant layer deposited from a coating composition comprising:
        (1) a film-forming resin,
        (2) a radiation cure initiator,
        (3) a colorant, and
        (4) a diluent,
        wherein the coating composition is substantially free of radiation curable material, and
    (b) at least one of a sealer and topcoat deposited from a radiation curable composition, applied over at least a portion of the stain layer and/or the toner layer.

5. The substrate of claim 4, wherein either:
    (i) the colorant later is deposited from a composition that comprises a cationic photoinitiator when the at least one of a sealer and topcoat are deposited from a radiation curable composition comprising a radiation curable material susceptible to cationic cure, or
    (ii) the colorant later is deposited from a composition that comprises a free radical photoinitiator when the at least one of a sealer and topcoat are deposited from a radiation curable composition comprising a radiation curable material susceptible to free radical cure.

6. A porous substrate at least partially coated with a multi-layer composite coating system, wherein the multi-layer composite coating system comprises:
    (a) a toner layer,
    (b) a stain layer deposited over at least a portion of the toner,
    (c) a sealer deposited from a radiation curable composition, wherein the sealer is deposited over at least a portion of the stain layer, and
    (d) a topcoat deposited from a radiation curable composition, wherein the topcoat is deposited over at least a portion of the sealer, and
    wherein at least one of the toner layer and the stain layer are deposited from a coating composition comprising:
        (1) a film-forming resin,
        (2) a radiation cure initiator,
        (3) a colorant, and
        (4) a diluent,
        wherein the coating composition is substantially free of radiation curable material.

7. The substrate of claim 6, wherein the sealer and topcoat radiation curable compositions comprise a polymer comprising an alkyd portion and a free radical curable portion.

8. The substrate of claim 1, wherein the coating composition comprises a stain or a toner.

9. The substrate of claim 1, wherein the film-forming resin comprises an alkyd resin or a cellulosic resin.

10. The substrate of claim 1, wherein the coating composition is completely free of radiation curable material.

11. The substrate of claim 1, wherein the radiation cure initiator comprises a photoinitiator selected from a cationic photoinitiator and/or a free radical photoinitiator.

12. The substrate of claim 11, wherein the photoinitiator comprises 2,4,6-trimethylbenzoyldiphenylphosphine oxide.

13. The substrate of claim 1, wherein the coating composition further comprises an additive comprising an organo-silicon and/or organo-fluorine containing molecule and/or polymer.

14. The substrate of claim 13, wherein the organo-silicon containing molecule and/or polymer comprises an organo silane.

15. The substrate of claim 14, wherein the organo silane comprises an amino silane, an epoxy silane, or a mixture thereof.

* * * * *